May 13, 1969     W. F. DE GROOT     3,443,761
BURNER AND HYDROCARBON INJECTION ASSEMBLY
FOR CARBON BLACK REACTORS
Filed Dec. 15, 1966
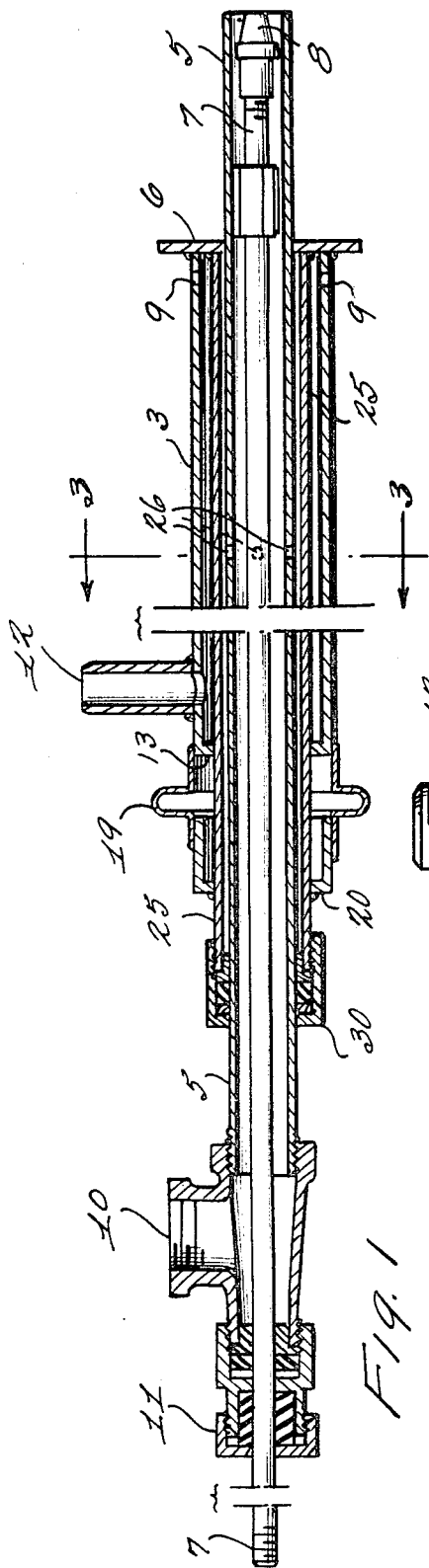
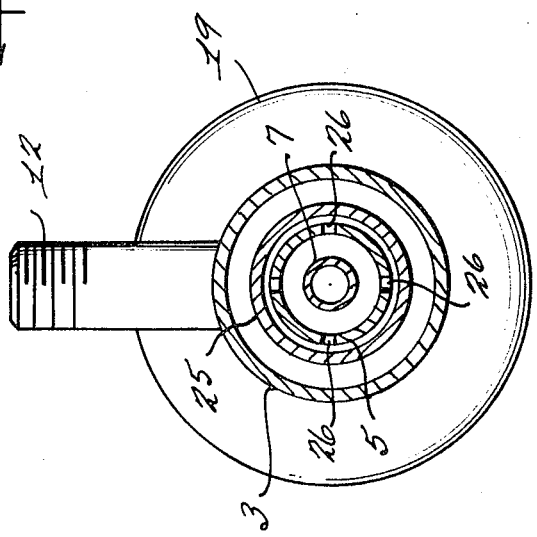
INVENTOR
WOUTER F. DE GROOT
BY L. DAVID TRAPNELL
ATTORNEY

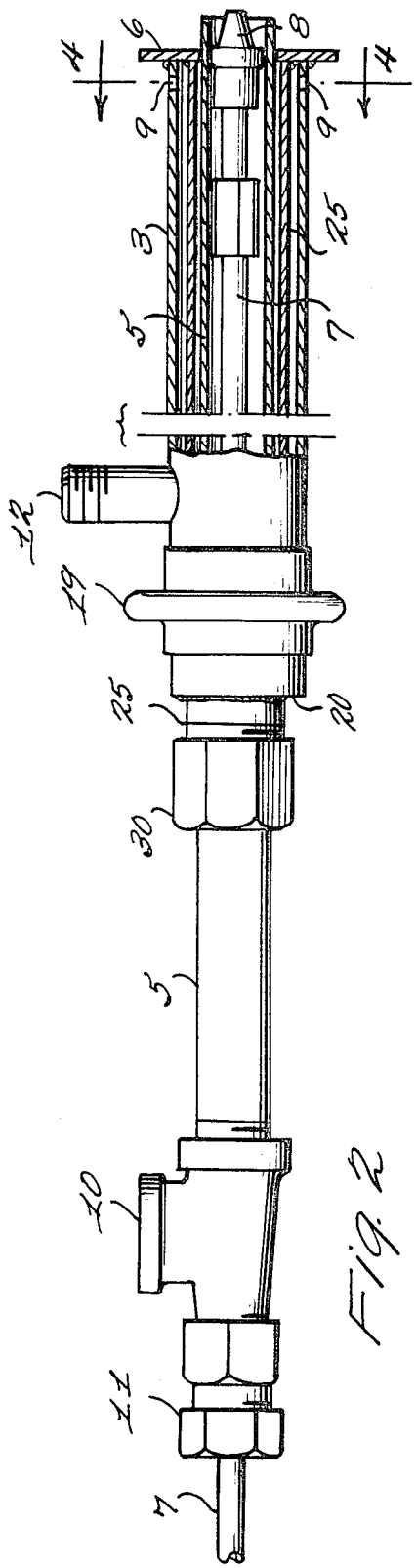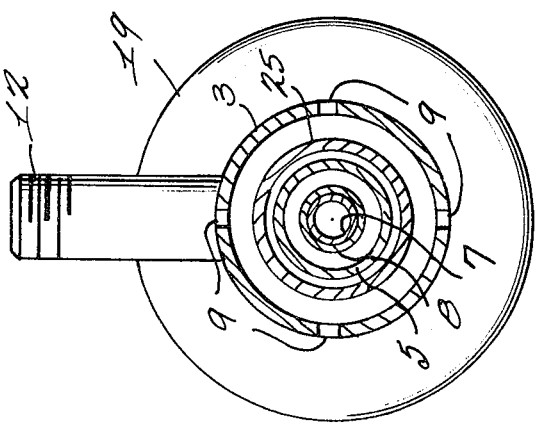

3,443,761
BURNER AND HYDROCARBON INJECTION ASSEMBLY FOR CARBON BLACK REACTORS
Wouter F. de Groot, Hoogvliet, Netherlands, assignor to Continental Carbon Company, Houston, Tex., a corporation of Delaware
Filed Dec. 15, 1966, Ser. No. 602,002
Int. Cl. B05b 7/06
U.S. Cl. 239—424            4 Claims

ABSTRACT OF THE DISCLOSURE

A combination of four concentric and radially spaced tubes provides for the maintenance of an axial flame in a carbon black reactor and for the introduction of fluid hydrocarbon feedstock to substantially the center of the flame; the arrangement of tubes being such that the axial air conduit and the feed stock conduit may be concurrently adjusted or replaced without interference with the combustion air and gas conduits and accordingly, the reactor permitted to operate under combustion or heat load until the axial air conduit and the gas conduit are again in operation.

---

This invention relates to the production of carbon black by the injection of a suitable hydrocarbon feedstock into an elongate reactor or combustion chamber containing high-temperature flames and gases, and more particularly to the apparatus for establishing the combustion and supplying the hydrocarbon feedstock thereto.

Generally stated, it has long been the practice in the carbon black art to supply the necessary gas- and -air for combustion, and the hydrocarbon feedstock in liquid form, through a series of concentrically arranged tubes and the annular spaces therebetween.

When utilizing apparatus of the type generally described, numerous and frequent problems arise, including the periodic need for replacement of the axial air conduit due to distortion and necessary adjustment or replacement of the axial air and oil conduits due to changing over the operation of the furnace or reactor to produce a desired carbon black of different grade.

Heretofore, all of the aforementioned changes, etc., have required the complete shutdown of the furnace or reactor for a substantial and costly period of time.

It is among the objects of the present invention to promote a burner and hydrocarbon injection assembly for carbon black reactors or furnaces which eliminates or substantially reduces the nature and extent of the aforementioned problems. That is, an apparatus of the class described which, after installation, permits the quick and easy switching of operations to produce different grades of carbon black, or the quick and easy repair or complete replacement of the axial air pipe or conduit, without shutting down the operation of the furnace or reactor.

According to the invention:

I. The relative positions of the axial air pipe and oil spray may be adjusted without changing the position of the entire burner and hydrocarbon injection assembly, thus enabling the produtcion of different grades of carbon black.

II. The axial air pipe can be readily repaired or replaced without removing the entire burner and hydrocarbon injection assembly. That is, if the inner end of the axial air pipe is distorted, the axial air pipe itself may be removed, the distorted portion sawed off, and the remainder of the axial air pipe reinstalled. This may be done several times before the axial air pipe is too short to function in its proper relationship. During the time necessary to accomplish this particular repair or replacement step, the reactor or furnace can be kept at a high temperature, since the flow of gas and combustion air thereinto may continue as before.

III. Closer tolerances of the spacers which position the feedstock pipe in the axial air pipe may be maintained due to the elimination of the otherwise necessary welding of a replacement axial air pipe, etc., which creates distortion.

Further objectives include the attainment of the foregoing ends with an apparatus which is utilizable on carbon black furnaces or reactors of existing construction, and one which is, at the same time, relatively simple and inexpensive to manufacture, install and maintain.

The foregoing and other objects of the invention will be more fully understood from the following description and annexed drawings, wherein like reference numerals designate like parts, and wherein FIGURE 1 is an elevational view, partly in section, illustrating a form of apparatus which embodies the teachings of the present invention;

FIGURE 2 is a view generally similar to that of FIGURE 1, but illustrating certain of the elements of the apparatus in changed position the purpose of which will appear hereinafter;

FIGURE 3 is a sectional view taken on the line 3—3 of FIGURE 1; and

FIGURE 4 is a sectional view taken on the line 4—4 of FIGURE 2.

Referring more particularly to the drawings, the numeral 3 designates a tube which is adapted to be suitably secured to the upstream or entrance end of the carbon black furnace or reactor (not shown) and project axially into the adjacent portion of the reaction chamber thereof.

A tube 5 of considerably smaller diameter is disposed concentrically in, and projects from, the inner end of the tube 3; and a right-angularly extending circular plate or disc 6 of substantially greater diameter closes the annular space between said tubes. The primary purpose of the circular plate or disc 6 is to prevent blowout of the flame under operating conditions and the inner end of the tube 3 is welded thereto as shown.

That portion of the tube 5 which projects from the inner end of the larger tube 3 is slidably received in a but slightly larger central aperture in the disc or circular plate 6.

Concentrically positioned in the tube 5 is a fluid hydrocarbon pipe 7 which is so maintained by means of pipe spacers of conventional design.

As shown in the drawings, the inner end of the fluid hydrocarbon supply pipe 7 carries a communicating spray head 8 the inner end of which is in approximately flush relationship with the adjacent end of the tube 5.

Immediately to the rear of the circular plate or disc 6 the wall of the tube 3 is provided with a plurality of radially disposed apertures 9 which substantially occupy a plane which is at right angles to the axis of said tube.

The rearward portion of the tube 5 communicates with a T-connection 10, the right-angular extension thereof communicating with a suitable source of air.

The annular space between the interior of the rearwardly extending nipple of the T and the exterior of the hydrocarbon supply pipe 7 is closed by an annular closure member 11, which is provided with a suitable packing gland, as shown.

A right-angularly extending gas inlet connection 12 supplies combustion gas to the rearward portion of the interior of the tube 3 from which it flows outwardly through the radially disposed apertures 9 in the wall thereof.

Slightly to the rear of its gas inlet connection 12, the tube 3 is provided with an annular closure member 13 of modified construction, as will appear hereinafter.

Connected to the exterior of the tube 3, at a point which is rearwardly of its annular closure member 13, is a single-convolution bellows type expansion joint 19 which is, in turn, connected to the exterior of an annular closure member 20 which is shown as similar in size and shape to the aforementioned annular closure member 13.

According to the teachings of the present invention, a tube 25 is disposed concentrically in the tube 3 in more closely spaced relationship with respect to the tube 5 which slidably extends through and projects from the central aperture in the circular plate or disc 6.

As shown, the downstream end of the tube 25 makes close contact with and is welded to the rear surface of the circular plate or disc 6 adjacent to, but spaced radially outward from, the central aperture therein through which the slidable tube 5 extends.

The wall of the tube 5 is provided with a plurality of radially disposed apertures 26 at positions which are spaced farther from the circular plate or disc 6 than the radially disclosed apertures 9 in the wall of the tube 3.

The wall of the tube 25 which is concentrically disposed between the tubes 3 and 5 is imperforate.

Referring now to the annular closure member 13 at the rearward end of the tube 3, and the annular closure member 20 which is connected to and disposed rearwardly of the single-convolution bellows type expansion joint 19, it will be observed that the openings of said annular closure members conform closely to the periphery of the tube 25, thus effectively closing off the upstream end of the annular space between the concentrically disposed tubes 3 and 25.

An annular closure member 30, with suitable packing gland, screw-threadedly engages the upstream or rearward end of the tube 25 and is provided with an annular flange which conforms to the periphery of the tube 5; thus closing the upstream end of the annular space between the concentrically disposed tubes 25 and 5.

According to the foregoing construction and arrangement, the tube 25, which is welded to the rearward surface of the circular plate or disc 6, serves as the fixed axial air pipe; and the tube 5 which slidably extends through and projects from the central aperture in said circular plate or disc serves as the longitudinally adjustable or completely removable axial air pipe, said longitudinal adjustment or complete removal being permitted upon the backing-off of the annular closure member 30 and the T-connection 10.

Afterwards, the slidably mounted axial air pipe 5 (whether adjusted, repaired or completely replaced) may be easily and quickly installed in the position illustrated in FIGURE 1 of the drawings.

Having thus described my invention, what I claim as new and desire to secure by Letters Patent is:

1. A burner and hydrocarbon injection assembly for carbon black reactors comprising, in combination
   a first elongate metallic tube;
   a concentrically disposed centrally apertured circular metallic plate of considerably larger diameter welded to one end of said first elongate metallic tube;
   said first elongate metallic tube having a plurality of radial apertures in close adjacency to said concentrically disposed centrally apertured circular metallic plate;
   a second elongate metallic tube disposed concentrically in said first elongate metallic tube and having one of its ends welded to said concentrically disposed centrally apertured circular metallic plate;
   a third elongate metallic tube disposed concentrically in and projecting from said second elongate metallic tube and said concentrically disposed centrally apertured circular metallic plate;
   a fourth elongate metallic tube disposed concentrically in said third elongate metallic tube;
   a spray head mounted on one end of said fourth elongate metallic tube and terminating in substantially flush relationship with respect to the corresponding end of said third elongate metallic tube;
   means for supplying gas to the interior of said first elongate metallic tube;
   means for supplying air to the interior of said third elongate metallic tube;
   means for supplying fluid hydrocarbon feedstock to the interior of said fourth elongate metallic tube; and
   means for supporting said third and fourth elongate metallic tubes in the relationship aforesaid in such manner as to permit their ready withdrawal with respect to said first and second elongate metallic tubes and the concentrically disposed centrally apertured circular metallic plate which is welded thereto.

2. The combination of claim 1 wherein the distance between the inner wall of the first elongate metallic tube and the outer wall of the second elongate metallic tube is subsantially greater than the distance between the inner wall of the second elongate metallic tube and the outer wall of the third elongate metallic tube.

3. The combination of claim 1 wherein the radially disposed apertures in the first elongate metallic tube substantially occupy a plane which is at right angles to the axis of said first elongate metallic tube.

4. The combination of claim 1 wherein the third elongate metallic tube is provided with a plurality of radial apertures which are further spaced from the concentrically disposed centrally apertured circular metallic plate than the radial apertures in the first elongate metallic tube.

References Cited

UNITED STATES PATENTS

| | | | |
|---|---|---|---|
| 2,976,128 | 3/1961 | Latham et al. | 23—209.6 X |
| 3,071,443 | 1/1963 | Bellew | 23—209.6 X |
| 3,087,796 | 4/1963 | Latham et al. | 23—259.5 |
| 3,163,203 | 12/1964 | Ihlenfield | 239—416.5 X |
| 3,353,915 | 11/1967 | Latham et al. | 23—259.5 X |
| 3,079,236 | 2/1963 | Heller et al. | |

M. HENSON WOOD, Jr., *Primary Examiner.*

HOWARD NATTER, *Assistant Examiner.*

U.S. Cl. X.R.

23—259.5; 239—600